United States Patent [19]

Beausoleil

[11] 3,714,637

[45] Jan. 30, 1973

[54] MONOLITHIC MEMORY UTILIZING DEFECTIVE STORAGE CELLS

[75] Inventor: William F. Beausoleil, Poughkeepsie, N.Y.

[73] Assignee: International Business Machines Corporation, Armonk, N.Y.

[22] Filed: Sept. 30, 1970

[21] Appl. No.: 76,917

[52] U.S. Cl. ............................340/173 R, 340/172.5
[51] Int. Cl. ............................G11c 7/00, G11c 11/40
[58] Field of Search ........................340/173 R, 172.5

[56] References Cited

UNITED STATES PATENTS

| | | | |
|---|---|---|---|
| 3,331,058 | 7/1967 | Perkins | 340/172.5 |
| 3,350,690 | 10/1967 | Rice | 340/172.5 |
| 3,422,402 | 1/1969 | Sakalag | 340/172.5 |
| 3,434,116 | 3/1969 | Anacker | 340/172.5 |
| 3,585,607 | 6/1971 | DeHaan | 340/173 |

*Primary Examiner*—Terrell W. Fears
*Attorney*—Hanifin and Jancin and Owen L. Lamb

[57] ABSTRACT

Transformation logic is provided in the addressing portion of a computer memory to permit the memory to be constructed of components containing defective bit cells. In the production of monolithic memory chips used in computer storage devices, a certain percentage is rejected in production as containing one or more defective bit cells on the chip. This apparatus arranges the almost perfect chips on a memory bit card so that all of the bit cards of a particular memory product are identical as to those sections containing defective bit cells. The valid cells are logically arranged in contiguous address locations by transformation logic which converts the address before it is presented to the memory bit cards. This circuitry places the defective bit positions in high order address locations which are not accessed.

7 Claims, 11 Drawing Figures

INVENTOR
WILLIAM F. BEAUSOLEIL

BY Owen Lamb

ATTORNEY

MONOLITHIC MEMORY UTILIZING DEFECTIVE STORAGE CELLS

CROSS-REFERENCE TO RELATED APPLICATIONS

Copending continuation-in-part application Ser. No. 198,869 entitled "Monolithic Memory Utilizing Defective Storage Cells" by W. F. Beausoleil, filed Nov. 15, 1971, discloses a memory structure utilizing the manufacturing method taught herein; copending continuation-in-part application Ser. No. 198,870 entitled "Address Translation Logic Which Permits A Monolithic Memory To Utilize Defective Storage Cells" by W. F. Beausoleil, filed Nov. 15, 1971, discloses translator circuits for use in the above memory. Abandoned application Ser. No. entitled "Monolithic Memory Using Partially Defective Chips" by J. Desautels, filed May 21, 1971 discloses another translator circuit, for use in the above memory.

BACKGROUND OF THE INVENTION

This invention relates to data processing system storages and more particularly to a method and means for utilizing defective memory components that normally would be rejected in production.

Monolithic memories are memories in which a number of storage cells are formed on a single silicon wafer. The wafers are cut into a number of smaller units called chips. These chips are arranged on substrates and the substrates are packaged on integrated circuit modules. The integrated circuit modules are soldered into printed circuit cards to make up a basic component of a memory. In the production of monolithic chips, the yield of good chips from the silicon wafer is low, especially in the first few years of production. For each perfect chip produced, there are a number of chips that are almost perfect, having localized imperfections which only render unusable a single cell or a few closely associated cells. Methods have been proposed in the past for utilizing partially defective chips. For example, error correction codes have been used to correct words read from the memory in which certain bits of the word are stored in defective cells. This method has the disadvantage that it reduces the reliability of the memory by decreasing the effectiveness of error correction of normal memory operations.

Another method requires rewiring during production which effectively bypasses defective cells. This method is expensive and results in memories which cannot be repaired with standard parts.

SUMMARY OF THE INVENTION

It is an object of this invention to provide a method and means for utilizing almost perfect chips in a monolithic memory to produce a usable memory which appears to the user to be comprised of all perfect chips.

It is a further object of this invention to provide a method of using almost perfect memory chips in the manufacture of a memory, which method does not require a rework of defective chips and does not require a significant change in the organization, wiring and packaging of the memory.

It is a further object of the invention to provide a low cost means for utilizing a large number of otherwise scrap chips from monolithic production lines to produce a usable memory product.

A further object of the invention is to provide a method and means for utilizing defective chips in a monolithic memory which does not result in different types of basic memory components for each different type of defective chip.

Briefly, the invention comprises a method and apparatus in which defective chips are sorted during the production process, and chips having defective areas in similar locations are arranged in the same pattern on each array card. Logic is provided between the memory address register and the array card which translates each address to thereby avoid the addressing of defective cells.

The almost perfect chips are arranged on the memory array card in such a manner that all memory bit cards of a particular memory product are identical as to which sections contain defective bit cells and which ones do not. The valid cells are logically placed in contiguous address locations by converting the memory address before presenting it to the decoders on the memory array card. The sections containing the invalid memory bit cells are logically placed in high order address positions which are beyond the maximum permissible valid addresses. For any particular memory, the memory bit capacity is decreased depending upon the yield of defective bits. However, the memory has the same characteristics as if it were populated by perfect chips. No new design of the bit card or module is necessary.

The foregoing and other objects, features and advantages of the invention will be apparent from the following more particular description of a preferred embodiment of the invention, as illustrated in the accompanying drawings.

BRIEF DESCRIPTION OF THE DRAWINGS

Referring to FIG. 1, a monolithic memory in which the invention is embodied is shown. The memory is comprised of a plurality of array cards 10, each card representing 1 bit position of a word in a three dimensional memory. Only one array card is shown, however, a number of such cards is necessary depending on how many bit positions are in a full word. The memory is addressed by means of an address stored in address register 12, which address is re-powered by address buffer 14.

Figure 1:
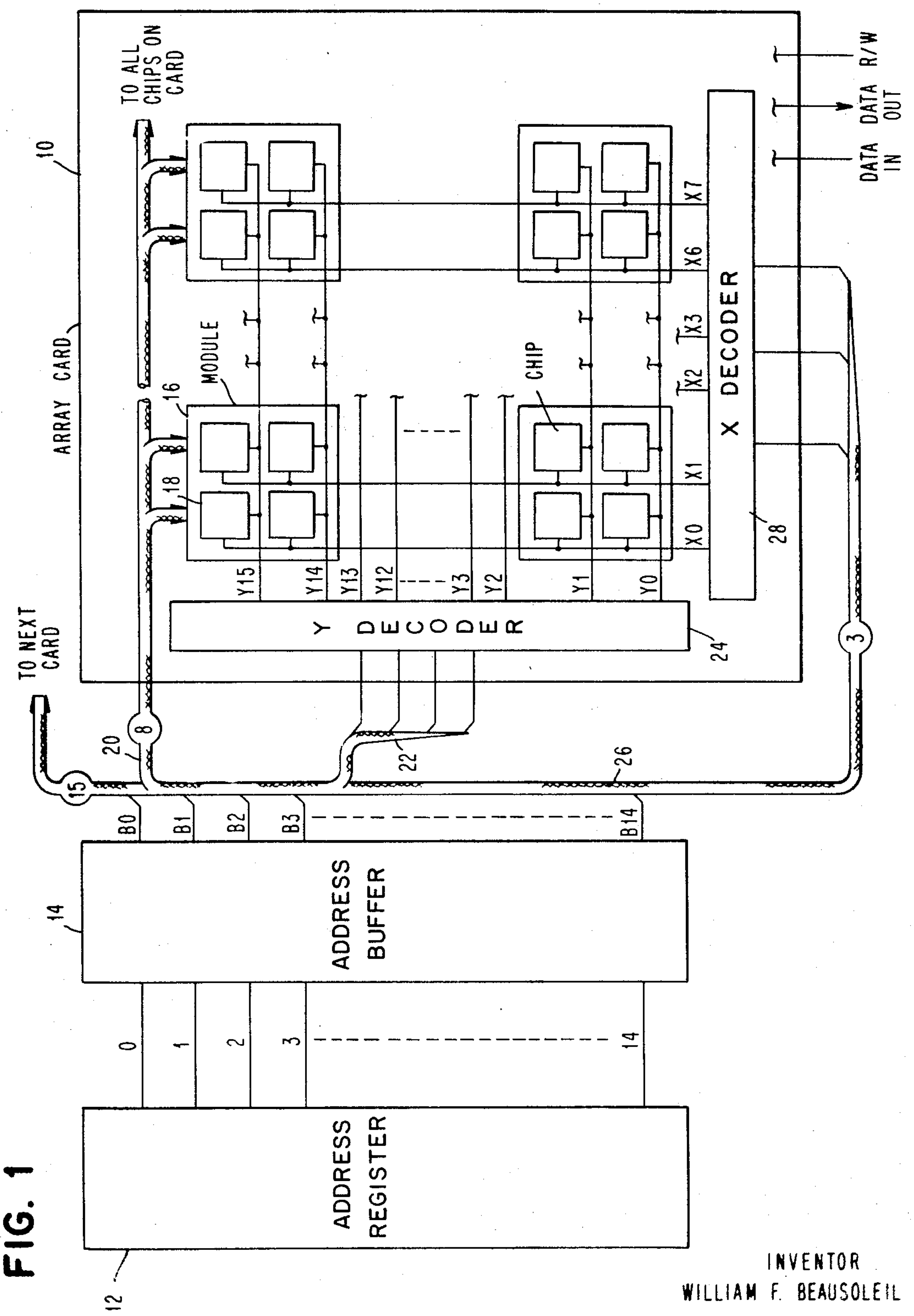
FIG. 1 is a block schematic diagram of a monolithic memory in which the invention is embodied.

Each array card 10 is comprised of a plurality of modules 16. Each module is comprised of four chips. A single chip is shown in more detail in FIG. 2. The bit addresses on a chip are arbitrarily divided into logical quadrants, and the two binary address bits which address these quadrants are called the quadrant address.

The output 20 from the address buffer 14 is connected to all chips throughout the memory and is decoded to select a single bit cell on the chip, as is more fully described with reference to FIG. 2.

The output 22 of the address buffer 14 drives a Y-decoder 24 and the output 26 from the address buffer drives an X-decoder 28 on the array card. The decoded outputs of the Y-decoder and the X-decoder energize a single chip at the intersection of the energized outputs.

Figure 2:
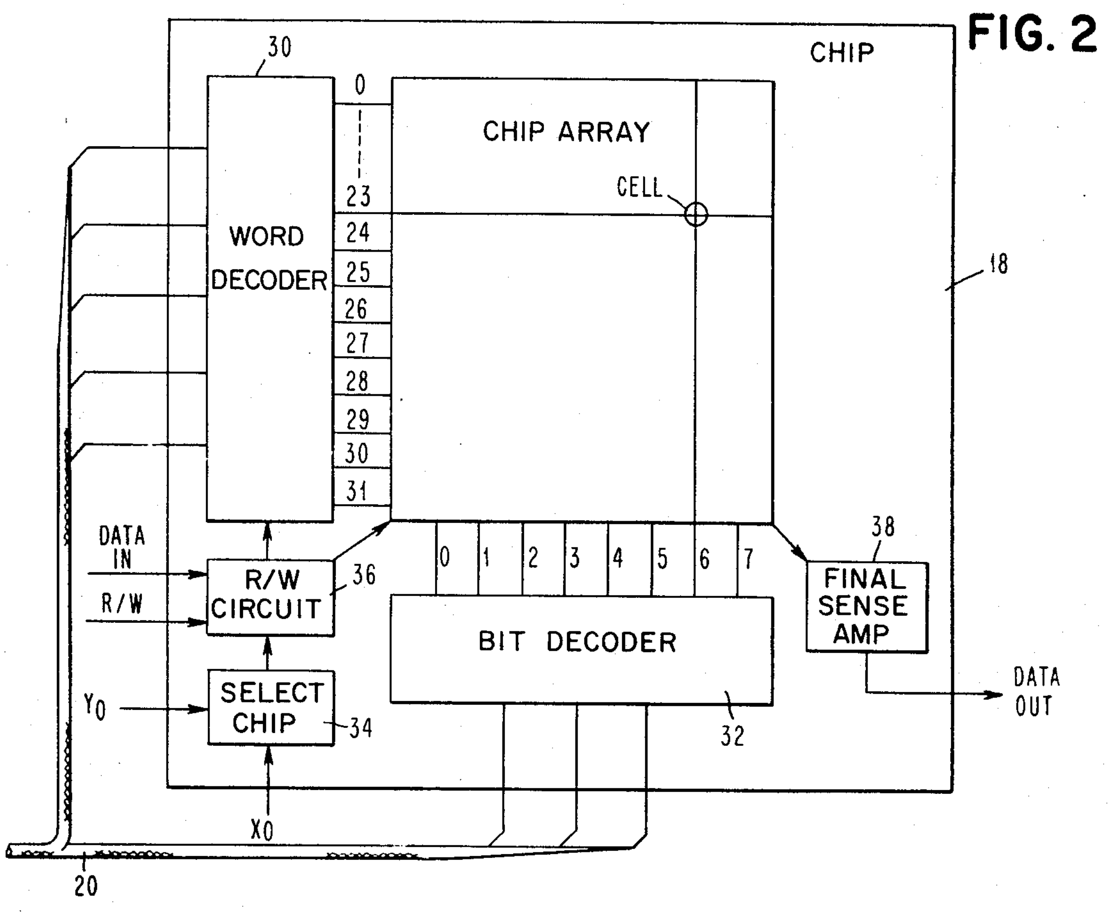
FIG. 2 is a more detailed block diagram of one chip of the memory of FIG. 1.

Referring to FIG. 2, a single chip is shown in more detail. The word decoder 30 and the bit decoder 32 decode the output 20 from the address buffer which results in the selection of a single bit from the chip at the intersection of the energized decoder output lines.

Each chip is also provided with select chip circuitry 34 responsive to the X and Y-coordinate lines. When the appropriate X and Y-lines are energized, the select chip logic 34 activates the read/write (R/W) circuit 36. When the R/W input of the R/W circuit is energized, the data on "data in" line is stored in the selected memory cell in the chip array. Only that cell which is selected by the word decoder and the bit decoder is activated for storage.

Similarly, data are sensed by the final sense amplifier 38 which is connected to the array in such a manner that it responds to read data from the cell which is energized by the word decoder and the bit decoder.

The details of the chip array, decoders, write circuitry, and read circuits vary from memory-to-memory and therefore, have not been shown in detail. A typical memory in which the invention may be embodied is shown in an article entitled "A High-Performance LSI Memory System" by Richard W. Bryant et al. on pages 71 – 77 in the July, 1970 issue of Computer Design.

Figure 3A:
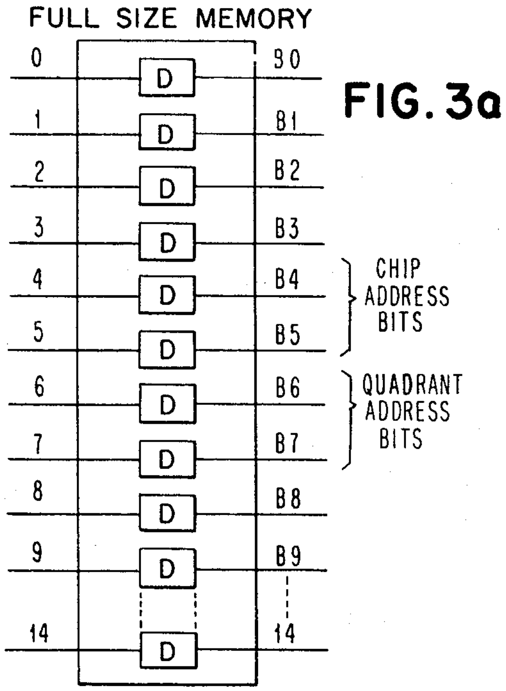
FIGS. 3A and 3B are a block schematic diagram and chart of an address buffer for a full size memory.

Referring to FIG. 3A, the organization of an address buffer for use in the memory when full-capacity, perfect chips are used is shown. The outputs 0–14 from the address register are unmodified by the address buffer and are driven to the module, chip, quadrant, and low order address positions as shown in FIG. 3A.

Figure 3B:
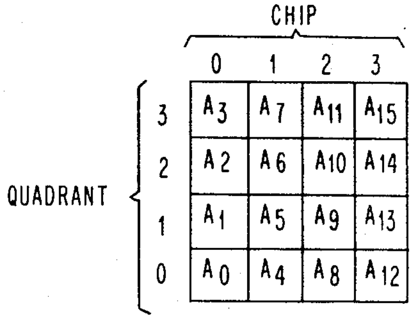

FIG. 3B is a diagram showing the quadrant and chip addresses selectable by a full size memory. The full size memory has no defective chips and therefore, all of the addresses A0, A1, . . . A15 are utilized in the module.

The only address bit positions of interest in explaining the invention are positions 4 and 5 representing the chip address and 6 and 7 representing an arbitrary quadrant address. Since in the drawing of FIG. 2 a chip has a total of 256 memory cells, each quadrant contains a total of 64 discrete addresses, represented in the drawing of FIG. 3B as A0, A1, A2 and A3 for chip zero. The address locations of FIG. 3B as selected by the address buffer 14 of FIG. 3A are contiguous, that is, if a binary sequence is presented to the input of address buffer 14, the addresses generated at the output are sequential. It should be understood that the addresses continue from module to module (i.e., the total addresses are A0 . . . An depending upon the number of modules).

Figure 4A:
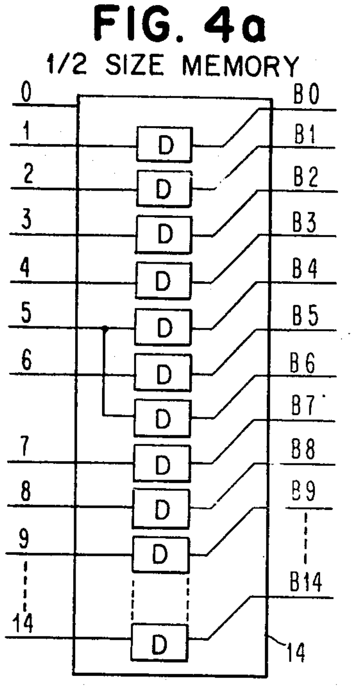
FIGS. 4A and 4B are a block schematic diagram and chart of a ½ size memory.

FIG. 4A is a circuit for the address buffer 14 which will yield a ½ size memory, that is, a memory in which half of the addresses are not selected. However, the addresses which are selected are contiguous.

Figure 4B:
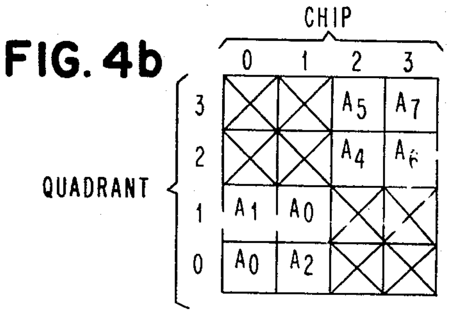

The method for constructing the ½ size memory is as follows. First, the chips are sorted into those chips which have defective addresses in the second and/or third quadrants only and chips having defects in the first and second quadrants only. Chips having defects in the second and/or third quadrants are placed in chip position 0 and chip position 1 of each module. Those having defects in the 0 and/or first quadrants are placed in the second and third chip positions of the module. Since the memory is only ½ size, position 0 of the address register is not used and all address leads are moved to the next lower bit position as shown in FIG. 4A. The address register bit position 5, 6 and 7 are cross-wired as shown to the four module inputs corresponding to the chip address and quadrant address. This produces contiguous addresses to the 8 good quadrants within the modulle in accordance with the address sequence shown in FIG. 4B.

Figure 5A:
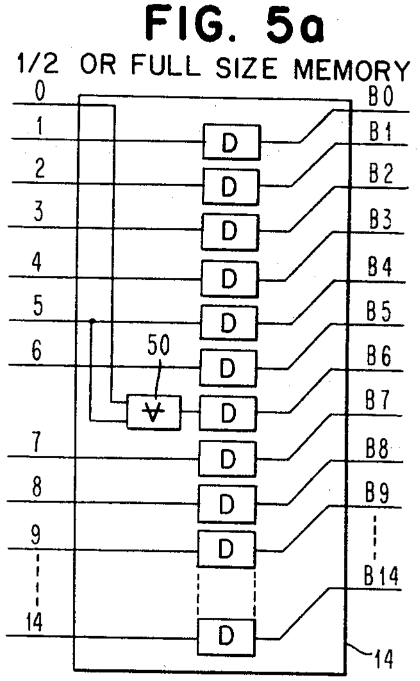
FIGS. 5A and 5B are a block schematic diagram and chart of an address buffer for utilization in a one-half or a full size memory.
Figure 5B:
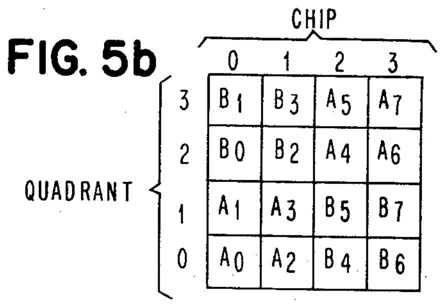

FIG. 5A illustrates the internal logic necessary in the address buffer 14 to provide a full size and/or a ½ size memory. This type of circuit could be used with a memory that is populated with all good circuit cards or with circuit cards having defects of the type described with respect to FIGS. 4A and 4B. This is accomplished with the circuitry of FIG. 5 by wiring the 0 input of the address buffer to an Exclusive OR circuit 50. When a ½ size memory is desired, the 0 input is not energized and the circuit behaves the same as that shown in FIG. 4A. However, if a full size memory is addressed, the 0 position is used and the Exclusive OR 50 produces a pattern as shown in FIG. 5B. Thus, the addresses are contiguous starting with A0 through An and continue with the next address B0 through address Bn to provide a full size memory.

Figures 6A, 6B:
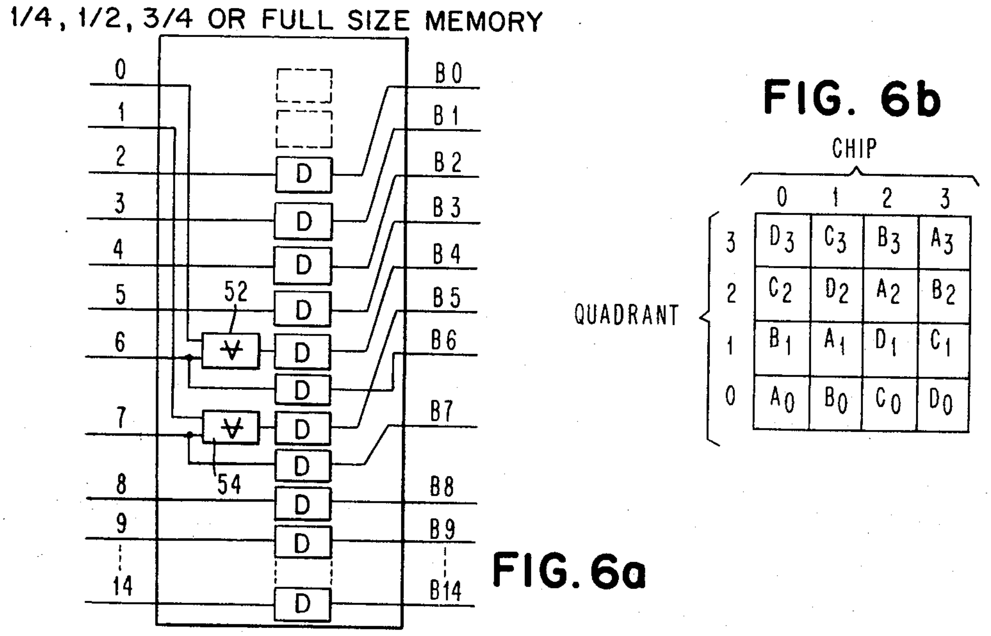
FIGS. 6A and 6B are a block schematic diagram and chart of a memory address buffer for use as a one-fourth, one-half, three-fourths, or full size memory.

FIG. 6A disclosed a circuit for use in the address buffer which will provide a one-fourth, one-half, three-fourths, or full size memory. If a ¼ memory is desired, (which, of course, may prove to be uneconomical) then the modules are sorted out into four different classes. Those having defects in quadrants 1, 2 and 3 are placed in the 0 chip position, those having defects in quadrants 0, 2 and 3 are placed in the chip 1 position on the module, those having defects in quadrants 01 and 3 are placed in the chip 2 position on the module and finally, those having defects in quadrants 0, 1 and 2 are placed in the chip 3 position on the module. Since this is a one-quarter size memory, the higher order bit positions 0 and 1 of the address register are not needed and therefore, are not energized. In this case, the Exclusive ORs 52 and 54 have no effect on the circuit and the address sequence is A0, A1, A2 . . . An (see FIG. 6B). If a ½ size memory is desired, the 1 bit position input to the buffer register 14 is energized causing the Exclusive OR 54 to provide sequential addresses above An, i.e., B0, B1, B2 . . . Bn.

Similarly, for a three-quarter size memory, the Exclusive ORs 52 and 54 produce next higher sequential address positions C0 - Cn. Finally, for a full size memory, the next sequential sequence D0 - Dn is produced utilizing the final positions of the chip.

Figure 7:
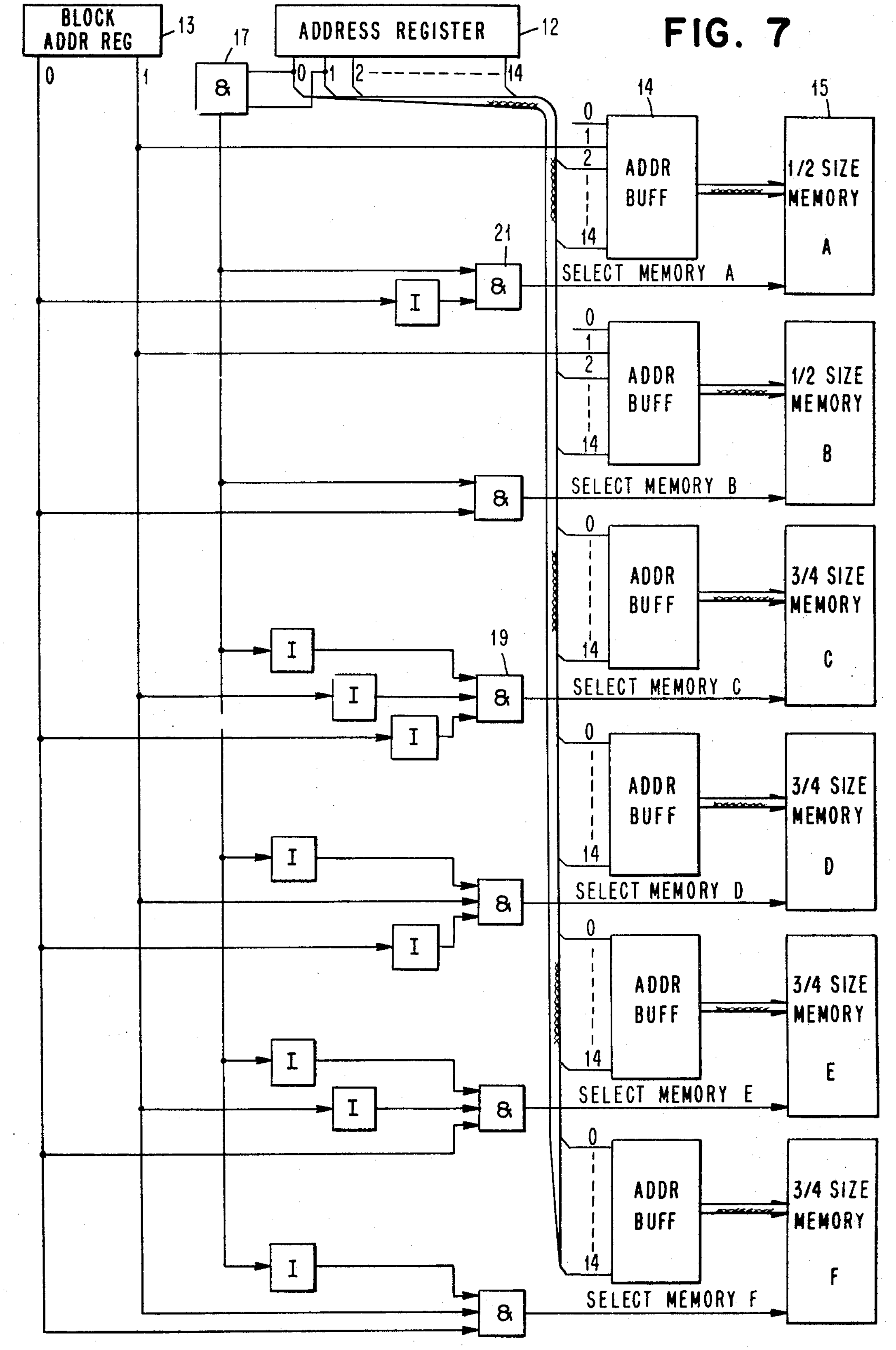
FIG. 7 is a block schematic diagram of a system combining partial memories.

Referring to FIG. 7, memories A, B, C, D, E and F are combined so that only a fraction of each memory is utilized in a manner such that the entire combination is addressed by contiguous memory addresses. The result is a combination of memories which appears to the user to be one logical memory.

Each memory 15 contains 32K addressable locations. Memories C, D, E and F are 75 percent utilized. Memories A and B are 50 percent utilized. Each memory is provided with a decoder 14 which can decode up to 15 binary inputs which will provide outputs for selecting the memory locations. Addresses are presented to the memory system by means of address register 12 which stores a 15 bit binary address. High order address positions are provided by block address register 13.

For low numbered addresses, the high order bit positions 0 and 1 of address register 12 do not energize AND circuit 17. The output of AND circuit 17 is negative and is inverted to thereby energize one leg of AND circuit 19. For low order addresses, the block address register 13 contains zeros. The output 1 which is negative is inverted to energize the other leg of AND circuit 19 thereby energizing the output SELECT C. This causes memory C to be selected. Memory C remains selected for approximately 24K contiguous addresses until the address is reached which causes the high order bit positions 0 and 1 of address register 12 to be energized. This causes an output from AND circuit 17 to energize AND circuit 21, the output of which energizes SELECT MEMORY A to select the ½ size memory A. The input to the address buffer 14 of memory A has the high order position 1 connected to the block address register 13. This provides for energizing the address buffer with only the low order bit positions 2 – 14. Memory A is addressed during this first selection for only one-fourth of the memory addresses. The second selection of memory A selects the remaining one-fourth of usable positions. This is illustrated by the following table which shows the selection sequence.

| Block Address | Address Reg. | |
|---|---|---|
| 00 | 00XX—X | Select Memory C |
| 00 | 11XX—X | Select Memory A (first ¼) |
| 01 | 00XX—X | Select Memory D |
| 01 | 11XX—X | Select Memory A (second ¼) |
| 10 | 00XX—X | Select Memory E |
| 10 | 11XX—X | Select Memory B (first ¼) |
| 11 | 00XX—X | Select Memory F |
| 11 | 11XX—X | Select Memory B (second ¼) |

Thus, contiguous binary addresses supplied to address register 12 and block address register 13 select non-contiguous memory addresses in the memories A – F.

SUMMARY

To summarize, a memory utilizing imperfect chips is constructed by the following method.

First, after good, rejects, and partially defective chips are separated in production, the chips are sorted in accordance with which logical addresses of the chips contain an address or addresses which are defective and therefore, normally unusable.

Second, chips which are identical as to which areas have defects and which do not are placed in the same relative chip position on each module in the memory.

Finally, the memory address selection circuitry is modified so that contiguous memory addresses presented to the register are constrained to only select those addresses on the chip which contain perfect memory cells.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of using perfect, partially defective and defective memory units in the manufacture of a monolithic memory of the type which is constructed of units containing a plurality of addressable memory cells, which method utilizes partially defective units comprising the steps of:
   - sorting said units into perfect, partially defective, and defective units;
   - sorting said partially defective units into classes based upon which cells of the units are defective;
   - physically arranging said units in said memory according to units that are identical as to which areas have defective cells and which do not, so that units in the same class are placed in the said relative position in said memory; and
   - translating contiguous addresses presented to said memory so that cells in said units containing defects are logically placed in high order address positions which are outside the range of said contiguous addresses.

2. The method of using perfect, partially defective and defective memory units in the manufacture of a monolithic memory of the type which is constructed of chips containing a plurality of addressable memory cells, which method utilizes partially defective chips comprising the steps of:
   - sorting said chips into perfect, partially defective, and defective chips;
   - sorting said partially defective chips into classes based upon which cells of the chips are defective;
   - physically arranging said chips in said memory according to chips that are identical as to which areas have defective cells and which do not, so that chips in the same class are placed in the same relative position in said memory; and
   - translating contiguous addresses presented to said memory so that cells in said chips containing defects are logically placed in high order address positions which are outside the range of said contiguous addresses.

3. The method of using perfect, partially defective and defective memory units in the manufacture of a monolithic memory of the type which is constructed of chips containing a plurality of memory cells, which chips are placed on modules, which modules are placed in an array on a circuit card, one card for each bit position of a word in said memory, comprising the steps of:
   - sorting said chips into perfect, partially defective, and defective chips;
   - sorting said partially defective chips into classes based upon which cells of the chips are defective;
   - physically arranging said chips on said modules by class according to chips that are identical as to which areas have defective cells and which do not, so that chips in the same class are placed in the same relative chip position on each module in the memory; and translating contiguous addresses presented to said memory so that word locations on the chips containing defects are logically placed in high order address positions which are outside the range of said contiguous addresses.

4. The method of using perfect, partially defective and defective memory units in the manufacture of a memory of the type which is constructed of units containing a plurality of addressable memory cells, which method utilizes partially defective units comprising the steps of:

sorting said units into classes based upon which areas of the units are not defective and which areas are defective;

physically arranging said units in said memory according to units that are identical as to which areas are not defective so that units in the same class are placed in the same relative position in said memory; and providing means for translating contiguous addresses presented to said memory so that cells in said units containing defects are logically placed in address positions which are outside the range of said contiguous addresses.

5. The method of using perfect, partially defective and defective memory units in the manufacture of a monolithic memory of the type which is constructed of chips containing a plurality of addressable memory cells, which method utilizes partially defective chips comprising the steps of:

sorting said chips into classes based upon which cells of the chips are not defective and which areas are defective;

physically arranging said chips in said memory according to chips that are identical as to which cells are not defective so that chips in the same class are placed in the same relative position in said memory; and providing means for translating contiguous addresses presented to said memory so that cells in said chips containing defects are logically placed in address positions which are outside the range of said contiguous addresses.

6. The method of using perfect, partially defective and defective memory units in the manufacture of a monolithic memory of the type which is constructed of chips containing a plurality of memory cells, which chips are placed on modules, which modules are placed in an array on a circuit card, one card for each bit position of a word in said memory, comprising the steps of:

sorting said chips into classes based upon which cells of the chips are not defective and which cells are defective;

physically arranging said chips on said modules by class according to chips that are identical as to which cells are not defective so that chips in the same class are placed in the same relative chip position on each module in the memory; and providing means for translating contiguous addresses presented to said memory so that word locations on the chips containing defects are logically placed in address positions which are outside the range of said contiguous addresses.

7. The method of using perfect, partially defective and defective memory units in the manufacture of a monolithic memory of the type which is constructed of units containing a plurality of addressable memory cells, which method utilizes partially defective units comprising the steps of:

testing said units to determine which areas of said units are defect free and which areas contain one or more defects;

sorting said units into classes based upon which areas of said units are defect free;

physically arranging said units in said memory so that units that correspond as to which areas are defect free are placed in the same relative position from bit location to bit location; and providing address translating means so that the lowest n addresses presented to said memory will sequentially address the defect free areas of said units, and the highest m addresses will address defective areas of said units, so that a reduced size non-defective memory is produced;

whereby units having a predetermined percentage of defect free areas are replaceable by units having a higher percentage of defect free areas to thereby extend the usable range of said memory into the higher order m address positions previously occupied by defective areas.

* * * * *